Patented Jan. 30, 1934

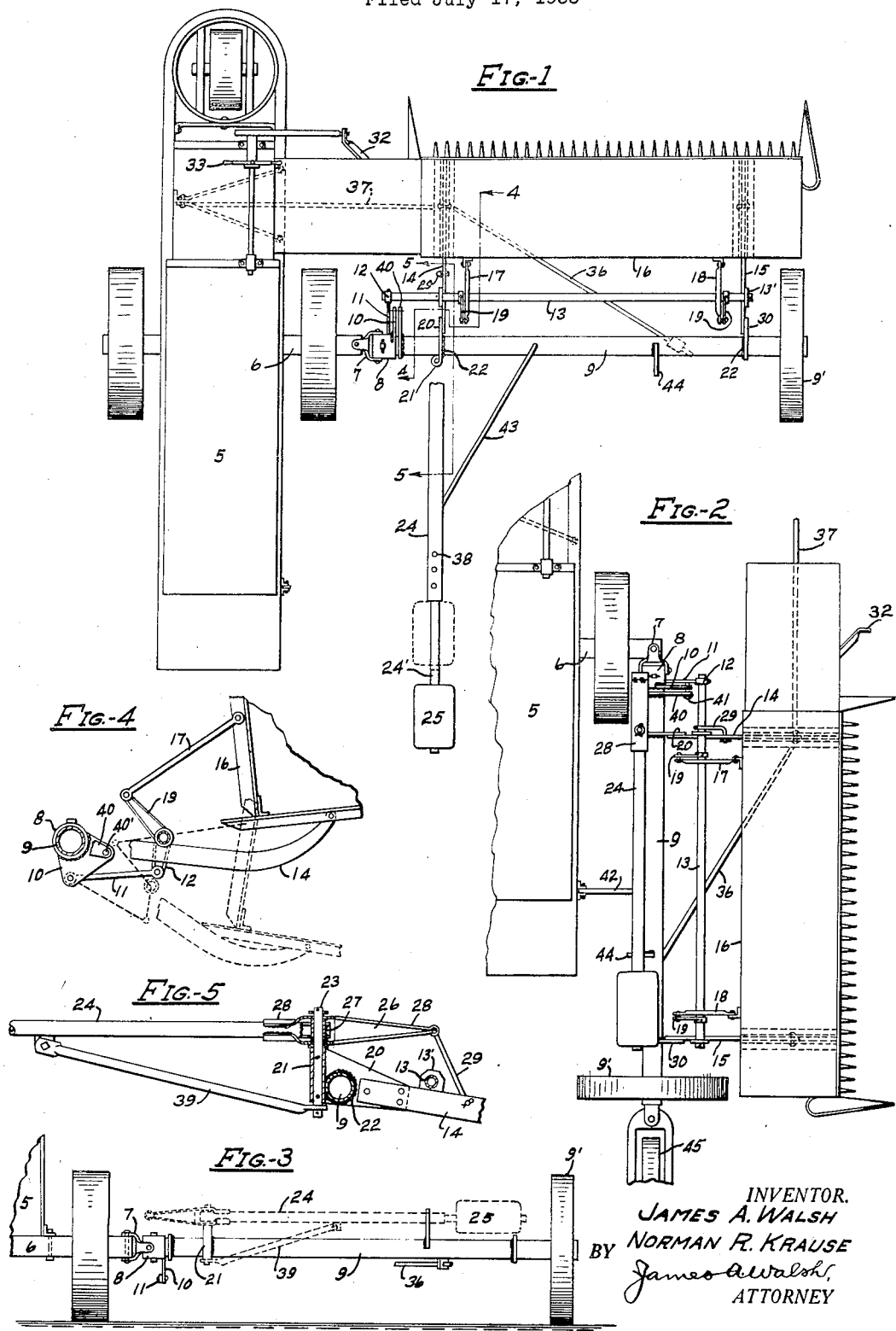

1,945,009

UNITED STATES PATENT OFFICE 1,945,009

HARVESTER

James A. Walsh and Norman R. Krause, Racine, Wis., assignors to J. I. Case Company, Racine, Wis., a corporation Application July 17, 1933. Serial No. 680,702

15 Claims. (Cl. 56—20)

In the operation of combines as commonly constructed it is necessary to provide means for counterbalancing the weight of the harvester element thereof, which to a large extent is at present accomplished by mounting thereon a weighted beam or beams extending rearwardly in such manner as to prevent folding of the harvester alongside the thresher to permit passage of the assembled elements through limited spaces as gateways, bridges and narrow roads, so that the harvester must be detached and then placed upon a special transporting truck, or the counterbalancing arm and weight removed and the harvester trailed behind the thresher when moving the machinery, and other methods are employed for detaching and dismantling the harvester, requiring appreciable labor and time. It is the object of our invention to improve the type of harvester referred to in general and particularly to provide a counterbalance therefor which it will be unnecessary to remove for the purpose stated and which will permit ready folding of the harvester alongside the thresher in a simple and expeditious manner as will further appear.

In the accompanying drawing, forming part hereof, Figure 1 is a plan view of a combine in operative position with our improvements applied to the harvester; Fig. 2, a fragmentary plan view of the machine showing the harvester folded alongside the thresher; Fig. 3, a rear elevation showing the counterbalance in dotted lines at rest upon the harvester axle; and Figs. 4 and 5 are enlarged details taken respectively on the dotted lines 4—4 and 5—5 in Fig. 1.

In the drawing the numeral 5 indicates the thresher which may be of any desired construction, to the wheeled axle 6 or other part of which a universal coupling member 7 is secured and to which the member 8 is connected in a well known manner and in which the harvester axle 9 carrying a grain wheel 9' is rockingly secured, the coupling as usual providing for the vertical and horizontal movement of the harvester.

To the coupling 8 a keeper 10 is welded or otherwise fixedly secured and which supports a link 11 connected to a vertical lever arm 12 to which a supporting rod 13 is secured and which rod extends in parallel relation to the axle 9 and is mounted on the harvester supporting arms 14, 15, and is also adjustably connected to the harvester wall 16 by the links 17, 18, supported on the rod 13 by lever arms 19. Adjacent to coupling 8 a combination plate 20 and socket 21 are fixedly secured to the axle 9, preferably by welding, 22, Fig. 5, in which socket a vertical pivot pin 23 is fixedly secured and upon which pin a counterbalancing arm 24 is mounted which may be of any desired construction, that illustrated having a flattened end 26 and including an integral sleeve 27 fitting on the pin 23, which arm is partially enclosed in a sheath or socket 28 welded thereto and connected by a link 29 to the arm 14, the latter in turn being secured to the plate 20. A plate 30 similar to plate 20, but without the socket 21, is fixedly secured near the outer end of the axle 9 by welding, 22, or otherwise, to which the arm 15 is secured and also supports rod 13, by an ear 13'. As is common, the harvester is adjusted vertically during field operation by a rack-bar or rod 32 controlled by a tiller-wheel 33 on the thresher, and by means of the novel equalizing linkage system shown and described the harvester in its vertical movements is maintained in substantially horizontal position at all times as indicated by the full and dotted lines in Fig. 4, it being understood that when manipulating the tiller-wheel 33 the fixed connection of the arms 14, 15, with the plates 20 and 30 which are rigidly secured to axle 9, causes the axle to rock in the coupling 8, and that for purposes of further stability said axle 9, arm 14 and thresher 5 may be connected and braced by detachable rods 36, 37, in a well known manner.

In counterbalancing the weight of the harvester as indicated we employ the swinging arm 24 pivotally mounted on axle 9, and in order to obtain a true balance said arm is telescopic in construction, compromising main section 24 and the telescoping section 24', the latter carrying a weight 25, which section 24' may be adjusted as desired and held in fixed relation to the section 24 by a pin 38 or otherwise as will be understood. As the weight 25 is quite heavy, several hundred pounds, and located a considerable distance from the pivotal connection of the arm 24, rough travel over uneven ground may cause a breaking strain or disarrangement of some of the assembled parts, to prevent which a brace-rod 39 is pivotally connected to the arm 24 and to the pivot pin 23, which provides a wide hinge range to relieve any stress to which the arm may be subjected. When it is desired to transport the combine, the harvester is adjusted vertically until the hole 40' in locking plate 40, which latter is welded to the axle 9, registers with a similar hole in the keeper 10, Figs. 2 and 4, when a pin 41 is inserted therethrough, and as the coupling 8 and keeper 10 are rigidly secured, the locking of the parts stated will prevent axle 9 from rocking and therefore maintain the harvester in elevated position free from the ground and in position to be swung alongside the thresher as indicated in Fig. 2, and which parts may be so retained in such relation to the thresher by a tie-rod or hook 42 substantially as indicated. However, before such adjustment, the brace-rod 37, is detached, as well as the diagonal rod 43, so that the weighted arm, detached from link 29, may be swung around in parallel relation to axle 9 and telescoped to the desired length when it can be securely held in such position by suitable fastening means on the axle, as a fork or clip 44, it being understood that the under brace rod 39 follows the counterbalancing arm in its horizontal swinging movements. It will be understood also that when in the folded position indicated in Fig. 2 a suitable transport wheel 45, as is common, may be connected to axle 9 to travel in the direction of the combine. It will thus be seen that a complete harvester equipped with a counterbalancing arm may be readily adjusted without dismantling to be folded alongside the thresher for transportation and as readily unfolded to operative position by use of the collapsible arm as described, and that by the linkage system disclosed the harvester structure may be vertically adjusted and maintained in horizontal position throughout its movements.

We claim as our invention:

1. In a harvester, an axle, means for rockingly coupling the axle to a thresher, supports fixedly secured to the axle, arms connecting the harvester with the supports, a rod mounted on the arms, a keeper fixedly secured to the coupling means, a linkage connecting the keeper to the rod, linkage connecting the rod with the harvester, and means for vertically adjusting the harvester to rock the axle in its coupling and whereby the linkages connecting said axle and rod and the rod to the harvester will be automatically adjusted to sustain the harvester substantially horizontally during its vertical movements.

2. In a harvester, an axle, means for rockingly coupling the axle to a thresher, supports fixedly secured to the axle, arms connecting the harvester with the supports, a rod mounted on the arms, a keeper fixedly secured to the coupling means, a linkage connecting the keeper to the rod, linkage connecting the rod with the harvester, means for vertically adjusting the harvester to rock the axle in its coupling and whereby the linkages connecting said axle and rod and the rod to the harvester will be automatically adjusted to sustain the harvester substantially horizontally during its vertical movements, and means on the axle adapted to engage the keeper to maintain the harvester and parts connecting it to the axle in predetermined fixed position.

3. In a harvester, an axle, means for rockingly coupling the axle to a thresher, arms connecting the harvester with the axle, a rod mounted on the arms, linkage connecting the rod and axle, linkage connecting the rod and harvester, and means for vertically adjusting the harvester to rock the axle in its coupling and whereby said linkages will become automatically adjusted to sustain the harvester substantially horizontally during its vertical movements.

4. In a harvester, an axle, means for rockingly coupling the axle to a thresher, arms connecting the harvester with the axle, a rod mounted on the arms in parallel relation to the axle, a vertical lever-arm, a link connecting the axle to the lever-arm, a normally inclined lever-arm connected to the vertical lever-arm, a link connecting the inclined lever arm to the harvester, and means for vertically adjusting the harvester to rock the axle in its coupling and whereby said lever-arms and links will become automatically adjusted to sustain the harvester substantially horizontally during its vertical movements.

5. In a harvester, an axle, means for rockingly coupling the axle to a thrasher, means for securing the harvester to the axle, linkages connecting the axle and harvester, and means for vertically adjusting the harvester to rock the axle whereby said linkages will be automatically adjusted to sustain the harvester platform substantially horizontally in its vertical movements.

6. In a harvester, an axle, means for rockingly coupling the axle to a thrasher, means for securing the harvester to the axle, linkages connecting the axle and harvester, means for vertically adjusting the harvester to rock the axle whereby said linkages will be automatically adjusted to sustain the harvester horizontally in its vertical movements, and means for locking the axle and the coupling to maintain the harvester and parts associated therewith in predetermined fixed position.

7. In a harvester, an axle, a support connected to the axle, a counterbalancing arm mounted on the support to move vertically and horizontally in relation to the axle, and means on the axle for engaging the arm when positioned in parallel relation to the latter.

8. In a harvester, an axle, a support connected to the axle, a weighted counterbalancing arm mounted on the support to move vertically and horizontally in relation to the axle, and reinforcing means connecting the arm to the support for stabilizing said arm.

9. In a harvester having a support, a counterbalancing arm mounted on the support to extend rearwardly therefrom when the harvester is in operable condition, and means connecting the arm to the support whereby the arm may be positioned in parallel relation to the support when the harvester is folded in relation to a thresher.

10. In a harvester having a support, a counterbalancing arm pivotally mounted on the support to extend rearwardly therefrom when the harvester is in operable condition, and means on the harvester engaging the arm to maintain it in extended position and whereby when said means is disengaged the arm may be swung horizontally adjacent the support so that the harvester may be folded alongside a thresher.

11. In a harvester having a support, an adjustable counterbalancing arm mounted on the support to extend rearwardly therefrom when the harvester is in operable condition, and means connecting the arm to the support whereby said arm may be positioned in parallel relation to the support when the harvester is folded alongside a thresher.

12. In a harvester having a support, pivotal means secured to the support, and an arm mounted on the pivotal means and connected to the harvester to extend rearwardly of the support to counterbalance the weight of the harvester and adapted to be swung horizontally on the pivotal means to rest on the support in parallel relation thereto.

13. In a harvester, a support, means for rockingly securing the support to a thresher, means for securing the harvester to the support, flexible means connecting the support and harvester, and means for vertically adjusting the harvester to rock said support whereby the flexible means will be adjusted to sustain the harvester platform horizontally in its vertical movements.

14. In a harvester, a support, means for rockingly securing the support to a thrasher, means for securing the harvester to the support, flexible means connecting the support and harvester, means for vertically adjusting the harvester to rock said support whereby the flexible means will be adjusted to sustain the harvester platform substantially horizontally in its vertical movements, and means for locking the axle and the coupling to maintain the harvester and parts associated therewith in predetermined fixed position.

15. In a harvester having a support, a counterbalancing arm extending across and mounted on the support to extend rearwardly therefrom for counterbalancing the weight of the harvester and also to be adjusted in parallel relation to the support, and means for connecting the arm to a harvester part for maintaining said arm in counterbalancing position.

JAMES A. WALSH.
NORMAN R. KRAUSE.